July 27, 1937.  R. F. BACON ET AL  2,087,889
RECOVERY OF SULPHUR
Filed Oct. 18, 1934
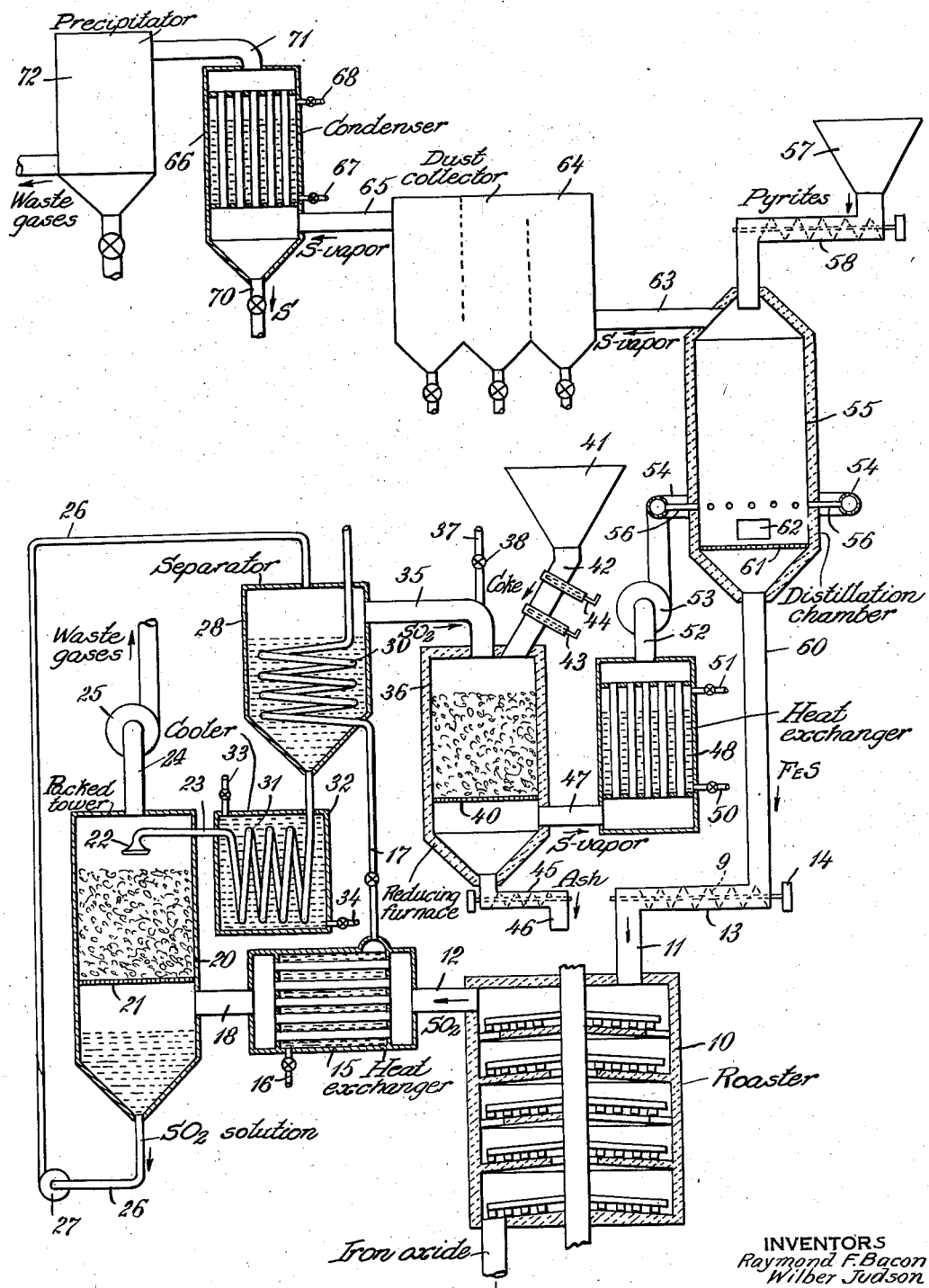
INVENTORS
Raymond F. Bacon
Wilber Judson
BY
Pennie, Davis, Marvin & Edmonds
ATTORNEYS Patented July 27, 1937

2,087,889

UNITED STATES PATENT OFFICE 2,087,889

RECOVERY OF SULPHUR

Raymond F. Bacon, Bronxville, N. Y., and Wilber Judson, Newgulf, Tex.

Application October 18, 1934, Serial No. 748,946

11 Claims. (Cl. 23—226)

This invention relates to the recovery of sulphur and has for an object the provision of an improved process and apparatus for recovering elemental sulphur from metal sulphide-bearing material. More particularly, the invention contemplates the provision of an improved process and apparatus for recovering elemental sulphur from pyrites.

According to some heretofore proposed processes for recovering elemental sulphur from pyrites, the pyrites is subjected to the action of air at elevated temperatures to convert the sulphur contained therein to sulphur dioxide, and the sulphur dioxide is subsequently subjected to the action of a reducing agent to produce elemental sulphur. Such processes have not been successful commercially largely because they require the use of excessive quantities of expensive reducing agents.

The present invention provides a method of recovering elemental sulphur without the use of excessive quantities of reducing agents. According to the method of the present invention, the pyrites, instead of being subjected directly to an oxidizing treatment, is first treated to effect the distillation of at least a portion of its volatile sulphur content. The resulting iron-bearing product, which may consist partly or substantially entirely of ferrous sulphide (FeS), is subjected to an oxidizing treatment to produce iron oxide and sulphur dioxide. The sulphur dioxide thus produced is subsequently reduced, and the resulting elemental sulphur may be combined with that obtained by distillation of the pyrites. Preferably, the hot gases from the reducing operation are passed in contact with the pyrites to effect the distillation of the volatile sulphur of the pyrites.

By distilling all or a portion of the volatile sulphur of the pyrites prior to the roasting operation, oxidation of this portion of the total sulphur is avoided. A smaller amount of sulphur dioxide is produced, and, therefore, a smaller amount of reducing agent is required. In addition, the proportion of elemental sulphur in the gases from the reducing operation is increased, and the problem of recovering the sulphur in liquid or solid form is simplified because of the smaller volume of gases to be treated and by virtue of the fact that higher concentrations of sulphur vapor permit more ready recovery of the total sulphur content of gases.

In producing elemental sulphur in accordance with the method of the invention, pyrites-bearing material is heated to effect the distillation of all or a portion of the volatile sulphur of the pyrites. The resulting iron sulphide-bearing material is subjected to a roasting operation to produce sulphur dioxide and convert the iron sulphide to iron oxide. Any suitable type of roasting operation may be employed. Thus, for example, the iron sulphide may be subjected to a low temperature roasting operating in a multiple hearth type of furnace, or to a high temperature roasting operation in which the iron sulphide is subjected to the action of an oxidizing gas while in suspension in the oxidizing gas or while molten. The sulphur dioxide is subjected to the action of a reducing agent. Any suitable solid, liquid or gaseous reducing agent may be employed for reducing the sulphur dioxide. Any suitable type of reducing furnace may be employed. For example, the sulphur dioxide may be passed through a porous bed of coke maintained in a reaction chamber or through a rotary kiln in which a charge of coke is maintained. The sulphur dioxide may be mixed with a gaseous reducing agent in any suitably enclosed and insulated reaction chamber.

If the oxidizing operation is so conducted that the temperature of the gases is sufficiently high to maintain a reaction between sulphur dioxide and a reducing agent, the sulphur dioxide containing gases may be passed directly in contact with the reducing agent to effect the reduction of the sulphur dioxide. If the temperature of the gases is not sufficiently high to maintain the desired reducing reaction, the gases are preferably treated to effect the concentration of the sulphur dioxide. The concentrated sulphur dioxide may then be mixed with air or other suitable oxidizing gas, if necessary, and subjected to the reducing treatment. Concentration of the sulphur dioxide may be carried out in any suitable manner. Thus, for example, the sulphur dioxide-bearing gases may be passed in contact with suitable liquid solvents or absorbents or suitable solid adsorbents capable of selectively absorbing the sulphur dioxide and the absorbed sulphur dioxide may be released in any suitable manner. Suitable liquids include water, ammonium sulphite, ammonium bisulphite, aqueous solutions of sodium borate, calcium borate, sodium phosphate and calcium phosphate, aniline and triethanolamine. Solid adsorbents include silica gel and charcoal.

The hot gases resulting from the reducing treatment are passed in contact with the pyrites-bearing material to effect the distillation of the volatile sulphur of the pyrites. If the temperature of the reducing reaction is higher than the fusing temperature of the pyrites, the gases from the reducing operation are preferably cooled before being passed in contact with the pyrites. Cooling of the gases may be effected in any suitable manner. Thus, for example, they may be passed in heat-exchange relationship with the air used in the process, that is, the air employed for oxidation of the iron sulphide or any air added to the sulphur dioxide for aiding in carrying out the reducing reaction or both. The hot gases from the reducing treatment may be passed in contact with the pyrites in any suitable manner. For example, the pyrites in finely divided form may be passed in countercurrent or cocurrent relationship with the hot gases through vertical shafts or through inclined stationary or rotary kilns, or the pyrites may be subjected to the action of the hot gases while maintained in porous beds.

According to a preferred process of the invention the pyrites-bearing material, ground to about 40-mesh or smaller, is subjected to a distillation operation in the course of which it is passed downwardly through a suitable distillation chamber in countercurrent to a stream of substantially non-oxidizing gas maintained at a temperature between about 550° C. and 900° C. and containing sufficient heat to effect vaporization or distillation of substantially all of the volatile sulphur of the pyrites. The finely divided solid material after removal of the volatile sulphur of the pyrites is conveyed in any suitable manner to a multiple hearth roaster in which it is subjected to the action of oxidizing gases. The roasting operation is preferably so conducted as to effect the substantially complete removal of sulphur from the iron sulphide in order to provide for improved recovery of sulphur and in order to produce a commercial iron oxide product. The resulting sulphur dioxide bearing gases are passed in contact with an agent capable of absorbing or dissolving the sulphur dioxide to effect the separation of the sulphur dioxide from the oxygen and inert gases associated therewith. A relatively pure sulphur dioxide gas is obtained by releasing the absorbed or dissolved sulphur dioxide from absorption or solution, for example, by heating the solution or other absorption medium. The sulphur dioxide thus obtained is passed in contact with a reducing agent with or without the addition of air to aid in maintaining the reducing reaction. The sulphur dioxide is reduced to elemental sulphur and the gaseous product resulting from the reducing treatment is conducted to the distillation chamber and passed in counter-current flow with the descending finely divided pyrites to effect the distillation of the volatile sulphur of the pyrites. The reducing operation is so conducted that the resulting gaseous product is substantially oxygen-free. The gases leaving the distillation chamber, containing the volatile sulphur removed from the pyrites by distillation and the sulphur obtained by reduction of the sulphur dioxide, are passed first through a suitable dust collector to remove solid products therefrom and then through a suitable condenser in which the elemental sulphur is collected.

The invention will be better understood from a consideration of the following description in conjunction with the accompanying drawing showing schematically apparatus which may be employed in carrying out a process of the invention.

The apparatus shown in the drawing comprises a multiple hearth roaster 10 of usual construction provided with a charging spout 11 and a gas outlet 12. The charging spout 11 communicates with a housing 13 containing a screw 9 provided at one end with a driving pulley 14. The screw 9 is associated with the housing 13 in such a manner, and the charging spout 11 is so connected to the housing 13, that the upper portion of the roaster 10 is effectively sealed against the egress of gas through the charging spout 11 and the housing 13 while the material to be roasted is being delivered to the roaster. The gas outlet 12 connects the upper portion of the roaster with a heat exchanger 15 in the nature of a fire tube boiler. The water jacketed portion of the heat exchanger 15 is provided with a water inlet 16 and a steam outlet 17. A conduit 18 connects the gas space within the heat exchanger 15 with the lower portion of a tower 20 containing inert packing material such as coke or broken brick supported on a grate 21 above the conduit 18. A spray head 22 attached to a water supply conduit 23 is disposed in the upper portion of the packed tower 20 above the packing material for delivering water to the tower. A gas outlet 24 communicates with the interior of the packed tower. A fan 25 is included in the gas outlet 24 for the purpose of drawing gases from the roaster 10 through the heat exchanger 15 and packed tower 20.

Liquid passing downwardly through the packing material is collected in the lower portion of the tower and is withdrawn therefrom through a conduit 26 by means of a pump 27. Liquid flowing through the conduit 26 is delivered to a gas separator 28 containing a steam coil 30 communicating with the steam outlet 17 of the heat exchanger 15. Liquid flows from the lower portion of the gas separator 28 through the coils 31 of a cooler 32. The cooling coils 31 are connected to the liquid conduit 23 leading to the spray head 22, and liquid flowing from the lower portion of the separator 28 is cooled and delivered in the form of a spray into the upper portion of the packed tower 20. The cooler 32 is provided with a water inlet 33 and a water outlet 34. Valves are provided at suitable points to control the flow of liquids and gases through the various conduits employed. The upper portion of the separator 28 is provided with a gas outlet 35 which communicates with the interior of a reducing furnace 36 adjacent the top thereof. An air inlet 37, having a control valve 39 included therein, communicates with the gas outlet 35 adjacent its point of connection with the reducing furnace 36.

A porous coke bed is supported on a grate 40 within the reducing furnace. Coke is delivered to the interior of the reducing furnace from a hopper 41 through a pipe 42 having valves 43 and 44 therein which may be opened alternately to permit the charging of coke without admitting air. The lower portion of the reducing furnace communicates with a screw conveyor 45 which may be operated to deliver solid materials from the interior of the reducing furnace to a discharge outlet 46 without permitting the ingress of air.

A gas outlet 47 communicates with the interior of the reducing furnace below the grate 40. Gases are delivered from the interior of the reducing furnace through the gas outlet 47 to a heat exchanger 48 in the form of a fire tube boiler. The heat exchanger 48 is provided with a water inlet 50 and a steam outlet 51. Gases liberated in the separator 28 are drawn through the reducing furnace 36 and heat exchanger 48 through a conduit 52 by means of a fan 53. Gases flowing through the conduit 52 are delivered to a manifold 54 surrounding a distillation chamber 55 and communicating with the interior of the distillation chamber through tuyères 56.

A charging hopper 57 is disposed above the distillation chamber and communicates with the interior thereof through a screw conveyor 58. A conduit 60 communicates with the lower portion of the distillation chamber and serves to conduct solid materials which pass through the distillation chamber to the housing 13 through which materials are charged to the roaster 10. A grate 61 is disposed within the lower portion of the distillation chamber to collect agglomerations too large for convenient passage through the conveyor housing 13. A work hole 62 provided with a suitable cover permits access to the interior of the distillation chamber for the purpose of removing or breaking agglomerations collected on the grate 61. Gases passing upwardly through the distillation chamber are conducted through an outlet 63 to a dust collector 64. A conduit 65 connects the dust collector with a condenser 66 which is in the form of a fire tube boiler. The condenser is provided with a water inlet 67 and a steam outlet 68. A valved outlet 70 is provided for withdrawing condensate collected in the lower portion of the condenser. Gases are conducted from the condenser through a conduit 71 to an electrical precipitator 72 in which substantially all particles of sulphur remaining in the condenser gases are removed.

In employing apparatus of the type illustrated in the drawing for carrying out a process of the invention, pyrites in finely divided form, preferably —40 mesh, is delivered from the hopper 57 to the interior of the distillation chamber 55 through the screw conveyor 58. The finely divided pyrites, in passing downwardly through the distillation chamber 55, encounters an upwardly flowing stream of gases having an initial temperature of about 900° C. Downward flow of the pyrites particles is impeded by the upward flow of gases and during the course of the downward flow of the pyrites particles, the particles become heated sufficiently that the volatile sulphur is liberated and passes out of the distillation chamber through the conduit 63 with the gas stream.

Removal of the volatile sulphur of the pyrites results in the production of a product which is substantially iron monosulphide. This product is delivered to the roaster 10 through the charging spout 11 by means of the conduit 60 and screw 9. The iron monosulphide in passing through the roaster 10 is oxidized, sulphur dioxide and iron oxide being produced. The iron oxide is discharged from the lower portion of the roaster and the sulphur dioxide, together with inert gases, such as nitrogen, contained in the air employed in the roasting operation passes through the outlet 12 to the heat exchanger 15 and thence to the absorption tower 20. During the course of the passage of the hot gases from the roaster through the heat exchanger 15, a portion of the heat contained in the gases is extracted by the water contained in the heat exchanger with the formation of steam, the gases entering the lower portion of the absorption tower pass upwardly in contact with downwardly flowing water from the spray head 22, the sulphur dioxide of the gases is absorbed by the water, and a sulphurous acid solution is collected in the lower portion of the absorption tower. The sulphurous acid solution from the absorption tower is delivered to the extractor 28 in which steam generated by heat from the roaster gases is employed to liberate the absorbed sulphur dioxide. Additional steam may be obtained from the heat exchangers 48 and 66, if necessary. The water from which sulphur dioxide has been extracted is cooled by passing through the cooling coil 31 and the cooled water is delivered to the absorption tower through the spray head 22 for use again as an absorption agent.

The sulphur dioxide gas liberated in the extractor 28, together with sufficient air to maintain the coke in the reducing furnace 36 in an incandescent state, is drawn through the reducing furnace and the heat exchanger 48. Ashes from the coke are removed from the lower portion of the reducing furnace through the screw conveyor 45 and discharge outlet 46. The reducing operation is so conducted that substantially all of the sulphur dioxide in the gases passing through the reducing furnace is reduced and the gases leaving the reducing furnace are substantially oxygen-free and have a temperature of about 1000° C. to 1200° C. The heat exchanger 48 is so operated and the rate of flow of hot gases is so controlled as to reduce the temperature of the gases from the reducing furnace 36 to a temperature not substantially higher than 900° C.

The gases leaving the heat exchanger 48 are delivered to the distillation chamber 55 in which the heat contained in the gases is utilized to effect the distillation of the volatile sulphur of the pyrites charged into the distillation chamber. At temperatures higher than about 900° C. agglomeration of the pyrites may become pronounced and it is, therefore, advisable to avoid the use of such high temperatures. Gases having temperatures of about 550° C. to 900° C. are most suitable. The gases passing out of the distillation chamber through the conduit 63 contain elemental sulphur produced by reduction of the sulphur dioxide formed in the roaster 10 as well as the elemental sulphur liberated by distillation of the pyrites. By suitably controlling the operation of the dust collector 64, substantially all solid substances may be removed from the gases and a relatively clean gas may be delivered to the condenser 66. The condenser 66 is so designed as to maintain a temperature of about 115° C. to 150° C. therein, preferably by regulation of the steam pressure, and the elemental sulphur vapor contained in the gases passing therefrom may be readily condensed and separated from the remaining gases. Liquid sulphur is collected in the lower portion of the condenser, and it may be removed through the outlet 70, as required. The electrical precipitator 72, which may be of any suitable or usual construction may be utilized for removing residual sulphur contained in the gases leaving the condenser.

It is to be understood that the apparatus illustrated in the drawing is merely illustrative and is not intended to be restrictive of the invention in any respect.

We claim:

1. The method of producing elemental sulphur which comprises heating pyrites to effect the distillation of the volatile sulphur atom and to form a product corresponding substantially to the monosulphide of iron, subjecting the resulting monosulphide to a roasting operation to produce sulphur dioxide and iron oxide, concentrating the sulphur dioxide, subjecting the concentrated sulphur dioxide to a reducing operation to form a gaseous product containing elemental sulphur, and utilizing the heat contained in the resulting gaseous product to effect the distillation of the volatile sulphur of the pyrites.

2. The method of producing elemental sulphur which comprises heating pyrites to effect the distillation of the volatile sulphur atom and to form a product corresponding substantially to the monosulphide of iron, subjecting the resulting monosulphide to a roasting operation to produce sulphur dioxide and iron oxide, concentrating the sulphur dioxide, and subjecting the concentrated sulphur dioxide to the action of incandescent coke at a temperature between about 1000° C. and 1200° C. to reduce the sulphur dioxide and form a gaseous product containing elemental sulphur, and utilizing the heat contained in the resulting gaseous product to effect the distillation of the volatile sulphur of the pyrites.

3. The method of producing elemental sulphur which comprises heating pyrites to effect the distillation of the volatile sulphur atom and to form a product corresponding substantially to the monosulphide of iron, subjecting the resulting monosulphide to a roasting operation to produce iron oxide and a gaseous product containing sulphur dioxide, passing the gaseous product in heat exchanging relationship with water to produce steam, subjecting the resulting cooled gaseous product to the action of a solvent for sulphur dioxide to form a solution of sulphur dioxide, releasing the sulphur dioxide by means of the heat contained in the steam produced, subjecting the released sulphur dioxide to the action of incandescent coke at a temperature between about 1000° C. and 1200° C. to reduce the sulphur dioxide and form a gaseous product containing elemental sulphur, and utilizing the heat contained in the resulting gaseous product to effect the distillation of the volatile sulphur of the pyrites.

4. The method of producing elemental sulphur which comprises heating pyrites to effect the distillation of the volatile sulphur atom and to form a product corresponding substantially to the monosulphide of iron, subjecting the resulting monosulphide to a roasting operation to produce sulphur dioxide and iron oxide, concentrating the sulphur dioxide, subjecting the concentrated sulphur dioxide to a reducing operation to form a substantially oxygen-free gaseous product containing elemental sulphur, and passing the resulting gaseous product in contact with the pyrites to effect the distillation of the volatile sulphur of the pyrites.

5. The method of producing elemental sulphur which comprises heating pyrites to effect the distillation of the volatile sulphur atom and to form a product corresponding substantially to the monosulphide of iron, subjecting the resulting monosulphide to a roasting operation to produce sulphur dioxide and iron oxide, concentrating the sulphur dioxide, and subjecting the concentrated sulphur dioxide to the action of incandescent coke at a temperature between about 1000° C. and 1200° C. to reduce the sulphur dioxide and form a substantially oxygen-free gaseous product containing elemental sulphur, and passing the resulting gaseous product in contact with the pyrites to effect the distillation of the volatile sulphur of the pyrites.

6. The method of producing elemental sulphur which comprises heating pyrites to effect the distillation of the volatile sulphur atom and to form a product corresponding substantially to the monosulphide of iron, subjecting the resulting monosulphide to a roasting operation to produce iron oxide and a gaseous product containing sulphur dioxide, passing the gaseous product in heat exchanging relationship with water to produce steam, subjecting the resulting cooled gaseous product to the action of a solvent for sulphur dioxide to form a solution of sulphur dioxide, releasing the sulphur dioxide by means of the heat contained in the steam produced, subjecting the released sulphur dioxide to the action of incandescent coke at a temperature between about 1000° C. and 1200° C. to reduce the sulphur dioxide and form a substantially oxygen-free gaseous product containing elemental sulphur, and passing the resulting gaseous product in contact with the pyrites to effect the distillation of the volatile sulphur of the pyrites.

7. Apparatus of the class described comprising a roaster, a reducing furnace, a distillation chamber, an absorption tower for concentrating sulphur dioxide, means for passing gases containing sulphur dioxide from the roaster to the absorption tower, means for introducing an absorbing medium capable of absorbing the sulphur dioxide into said tower, a separator for liberating sulphur dioxide from the absorbing medium, conduits communicating with the interior of the absorption tower and with the interior of the separator for passing absorbing medium containing sulphur dioxide from the absorption tower to the separator and for passing absorbing medium from which the sulphur dioxide has been liberated from the separator to the absorption tower, a conduit communicating with the interior of the separator and with the interior of the reducing furnace for passing concentrated sulphur dioxide from the separator to the reducing furnace, a heat exchanger for cooling the hot gases from the reducing chamber, means for passing hot gases from the reducing furnace to the heat-exchanger, a conduit communicating with the interior of the heat exchanger and the interior of the distillation chamber for passing the cooled gases from the heat exchanger to the distillation chamber, means for withdrawing gases from the distillation chamber, means for recovering elemental sulphur from the gases withdrawn from the distillation chamber, and means for passing solid residue from the distillation chamber to the roaster.

8. The method of producing elemental sulphur which comprises subjecting iron sulphide bearing material to an oxidizing operation so as to produce a gaseous product containing sulphur dioxide, passing said gaseous product in contact with a bed of coke at a temperature exceeding 1000° C., thereby to produce a relatively hot gaseous product containing elemental sulphur, cooling the gaseous product containing elemental sulphur to a temperature not substantially higher than about 900° C., passing the cooled gaseous product in contact with pyrites in such manner that distillation of the volatile sulphur of the pyrites is effected and an iron sulphide bearing residue is produced, and subjecting the iron sulphide bearing residue to the oxidizing operation.

9. The method of producing elemental sulphur which comprises subjecting iron sulphide bearing material to an oxidizing operation so as to produce a gaseous product containing sulphur dioxide ide, passing said gaseous product in contact with a bed of coke at a temperature of about 1200° C., thereby to produce a relatively hot gaseous product containing elemental sulphur, cooling the gaseous product containing elemental sulphur to a temperature between about 500° C., and 900° C., passing the cooled gaseous product in contact with pyrites in such manner that distillation of the volatile sulphur of the pyrites is effected and an iron sulphide bearing residue is produced, and subjecting the iron sulphide bearing residue to the oxidizing operation.

10. The method of producing elemental sulphur which comprises heating pyrites sufficiently to effect distillation of the volatile sulphur atom thereof and to form a product corresponding substantially to the monosulphide of iron, subjecting the resulting monosulphide to a roasting operation in a suitable furnace to produce sulphur dioxide and iron oxide, withdrawing the sulphur dioxide from the furnace, passing the sulphur dioxide after withdrawal thereof from the furnace in contact with a bed of reducing agent consisting essentially of coke at a sufficiently high temperature to reduce the sulphur dioxide and to form a gaseous product containing elemental sulphur, and passing the resulting gaseous product in contact with pyrites in a distillation chamber in such manner that distillation of the volatile sulphur of the pyrites is effected.

11. The method of producing elemental sulphur which comprises heating pyrites in suspension to effect the distillation of the volatile sulphur atom and to form a product corresponding substantially to the monosulphide of iron, subjecting the resulting monosulphide to a roasting operation in a suitable furnace to produce sulphur dioxide and iron oxide, withdrawing the sulphur dioxide from the furnace, passing the sulphur dioxide after withdrawal thereof from the furnace in contact with a bed of reducing agent consisting essentially of coke at a sufficiently high temperature to reduce the sulphur dioxide and to form a gaseous product containing elemental sulphur, and passing the resulting gaseous product in contact with finely divided pyrites in a suspension distillation chamber in such manner that suspension distillation of the volatile sulphur of the pyrites is effected.

RAYMOND F. BACON.
WILBER JUDSON.